(12) United States Patent
Reddy

(10) Patent No.: US 7,796,404 B2
(45) Date of Patent: Sep. 14, 2010

(54) LLC CONVERTER SYNCHRONOUS FET CONTROLLER AND METHOD OF OPERATION THEREOF

(75) Inventor: Raghothama Reddy, Murphy, TX (US)

(73) Assignee: Lineage Power Corporation

( * ) Notice: Subject to any disclaimer, the term of this patent is extended or adjusted under 35 U.S.C. 154(b) by 78 days.

(21) Appl. No.: 12/257,363

(22) Filed: Oct. 23, 2008

(65) Prior Publication Data
US 2010/0103710 A1    Apr. 29, 2010

(51) Int. Cl.
*H02M 3/335* (2006.01)
*H02M 7/217* (2006.01)

(52) U.S. Cl. .......................... 363/16; 363/127

(58) Field of Classification Search .............. 363/16, 363/140, 89, 127
See application file for complete search history.

(56) References Cited

U.S. PATENT DOCUMENTS

| | | | | |
|---|---|---|---|---|
| 6,055,170 A * | 4/2000 | Yee | ............................. | 363/89 |
| 6,535,400 B2 * | 3/2003 | Bridge | .................... | 363/21.06 |
| 6,870,747 B2 * | 3/2005 | Bridge | .................... | 363/21.06 |
| 7,042,739 B2 * | 5/2006 | Nagai et al. | .............. | 363/21.06 |

\* cited by examiner

*Primary Examiner*—Shawn Riley

(57) ABSTRACT

A method for operating a power controller is provided. The method includes activating a rectifying FET upon a detection of an activation body diode conduction current occurring in the rectifying FET. The method generates an activation signal for a corresponding primary FET. The method further includes deactivating the corresponding rectifying FET upon a reception of a deactivation signal. The method further includes then deactivating the corresponding primary FET after delaying the deactivation signal, wherein the delay lessens a conduction time of a deactivation body current of the corresponding rectifying FET. The method further includes generating a deactivation signal and deactivating the corresponding rectifying FET upon a reception of the deactivation signal and deactivating the primary FET after delaying the deactivation signal. The delaying lessens a conduction time of a deactivation body current of the corresponding rectifying FET.

26 Claims, 5 Drawing Sheets

LLC CONVERTER SYNCHRONOUS FET CONTROLLER AND METHOD OF OPERATION THEREOF

TECHNICAL FIELD OF THE INVENTION

The invention is directed, in general, to a synchronous power converter and, more specifically, to a timing of a rectification of a secondary side of the synchronous power converter.

BACKGROUND OF THE INVENTION

Synchronous power converters are an ever-increasingly important part of power conversion strategies and systems. One type of power converter that has been of increasing interest is the "inductor inductor capacitor" converter ("LLC converter"), due to various advantages associated therewith. For example, please see Yang, "Topology Investigation for Front End DC/DC Power Conversion for Distributed Power System," Virginia Polytechnic Institute and State University, 2003, incorporated herein by reference in its entirety.

However, there are certain drawbacks in employment of conventional LLC converters. These drawbacks can include a substantial "body diode conduction loss" of various transistors during a rectification cycle. For example, U.S. Pat. No. 7,184,280 to Sun, et al., entitled, "LLC Series Resonant Converter and the Driving Method for the Synchronous Rectification Power Switches Thereof," generally illustrates an LLC converter with transistors having significant body diode conduction.

Accordingly, what is needed in the art is an LLC converter that addresses at least some of the drawbacks identified above.

SUMMARY OF THE INVENTION

To address the above-discussed deficiencies of the prior art, one aspect of the invention provides a synchronous field effect transistor (FET) power controller, including a first rectifying FET. This aspect further provides a first driver coupled to the first rectifying FET. The first driver is configured to both: (a) activate the first rectifying FET if the first driver senses an activation body diode conduction current of the first rectifying FET and (b) deactivate the first rectifying FET if the first driver receives a first deactivation signal. This aspect further provides a first primary FET that is deactivated by a delay of the first deactivation signal. In this aspect, the delay lessens duration of a conduction time of a deactivation body diode conduction current of the first rectifying FET.

In another aspect, a method for operating a power controller is provided. The method includes activating a rectifying FET upon a detection of an activation body diode conduction current occurring in the rectifying FET. The method further includes generating an activation signal for a corresponding primary FET. The method further includes deactivating the corresponding rectifying FET upon a reception of a deactivation signal. The method further includes then deactivating the corresponding primary FET after delaying the deactivation signal, wherein the delay lessens a conduction time of a deactivation body current of the corresponding rectifying FET. The method further includes generating a deactivation signal and deactivating the corresponding rectifying FET upon a reception of the deactivation signal and deactivating the primary FET after delaying the deactivation signal. The delaying lessens a conduction time of a deactivation body current of the corresponding rectifying FET.

In yet another aspect, a power converter is provided. The power converter includes a plurality of primary FETs. This aspect provides a first primary inductor and a primary capacitor coupled to the plurality of primary FETs, and a transformer coupled to the primary capacitor. This aspect further provides a plurality of rectifying FETs coupled to the transformer and a first and second driver, each of the first and second drivers coupled to a corresponding rectifying FET of the plurality of rectifying FETs. Each driver is configured to: a) activate its corresponding coupled rectifying FET if the driver senses an activation body diode conduction current of its coupled rectifying FET, and b) deactivate its coupled rectifying FET if the driver receives a deactivation signal. The primary FETs are each deactivated by a delay of a corresponding deactivation signal. The delays each lessen duration of a conduction time of a deactivation body diode conduction current of the first and second rectifying FETs.

The foregoing has outlined certain aspects and embodiments of the invention so that those skilled in the pertinent art may better understand the detailed description of the invention that follows. Additional aspects and embodiments will be described hereinafter that form the subject of the claims of the invention. Those skilled in the pertinent art should appreciate that they can readily use the disclosed aspects and embodiments as a basis for designing or modifying other structures for carrying out the same purposes of the invention. Those skilled in the pertinent art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION

Generally, the present disclosure recognizes that it is advantageous to control and limit forward body diode conduction in an LLC converter. Unlike conventional LLC converters, which generally relied upon "worst case" tolerance design to control timing of synchronization of primary and secondary ("rectifying") transistors, the application employs timed switching sequences to turn on and off the various synchronizing transistors.

Figure 1:
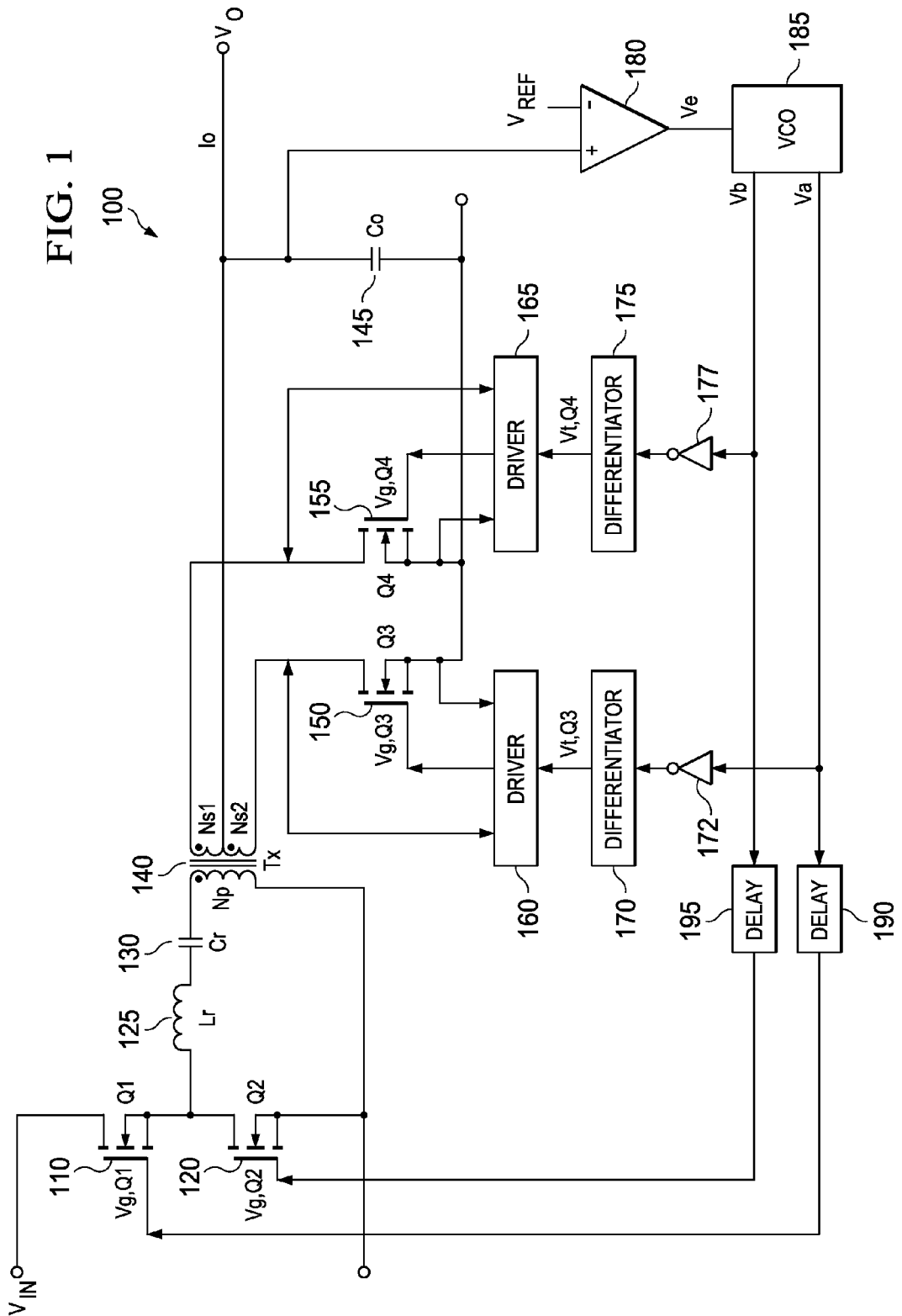
FIG. 1 is a diagram of one embodiment of an LLC converter constructed according to the principles of the invention.

Referring initially to FIG. 1, illustrated is an embodiment of an LLC converter 100 ("LLC 100") constructed according to the principles of the invention. First, a description of the overall construction of the LLC converter 100 will be given. Then, a description of its operation will be given regarding timing diagrams FIGS. 3A and 3B.

In the LLC 100, a voltage input "$V_{in}$" can be applied across a source of a first primary ("Q1") FET, such as metal-oxide-semiconductor field-effect transistor ("MOSFET") 110 and a drain of a second primary FET, such as MOSFET ("Q2") 120. A drain of the Q1 110 and a source of the Q2 120 are coupled to a resonant inductor $L_r$ 125, a first resonant parameter. The inductor $L_r$ 125 is coupled to a resonant capacitor $C_r$ 130, a second resonant parameter. The capacitor $C_r$ 130 is coupled to a primary side of a transformer 140. The transformer 140 has a magnetizing inductance $L_m$, a third resonant parameter. In some embodiments, the series resonant inductor $L_s$ can also be formed by leakage inductance from the transformer 140. The primary side of the transformer 140 is also coupled to a source of the Q2 120, and hence to $V_{in}$.

Such three resonant parameters determine two characteristic resonant frequencies $F_s$ and $F_m$ shown in following:

$$Fs = \frac{1}{\{2\pi\sqrt{(Ls*Cs)}\}}$$

$$Fm = \frac{1}{\{2\pi\sqrt{\{(Ls+Lm)*Cs\}}\}}$$

The power converter operates at or above $F_s$ during normal operation and would operate between $F_s$ and $F_m$ during an AC drop out.

A secondary ("rectification") side of the transformer is a center-tapped transformer, i.e., it is divided into two sections, $Ns_1$ and $Ns_2$. The center-tapped portion of the secondary side is coupled to a positive node of an output port $V_o$. The negative portion of $Ns_2$ is coupled to a drain of a first secondary FET ("Q3") 150. The positive portion of $Ns_1$ is coupled to a drain of a second secondary FET ("Q4") 155. The source of Q3 150 is coupled to a negative node of $V_o$, and the source of Q4 155 is coupled to the negative node of $V_o$. An output capacitor 145 is coupled between the first and second nodes of the output port $V_o$.

An output voltage error amplifier 180 is coupled to the center tap of the transformer 180, and therefore to the positive node of $V_o$. The error amplifier 180 compares a voltage of $V_o$ to a reference voltage $V_{ref}$. If $V_o$ is greater than the $V_{ref}$ then the output of the error amplifier $V_e$ will increase, resulting in higher switching frequency from the Voltage controlled oscillator (VCO) 185. For $V_o$ lower than the voltage $V_{ref}$ output voltage of the error amplifier $V_e$ will reduce resulting lower switching frequency from the VCO 185. One goal of the Voltage error amplifier 180 is to maintain the output voltage equal to the reference Voltage. In many embodiments, the magnitude of $V_e$ is clamped to a minimum value such that a minimum operating frequency is not below $F_m$ and a maximum value of $V_e$ is clamped to a maximum value such that an operating frequency does not exceed $1.5*F_s$.

Figure 3A:
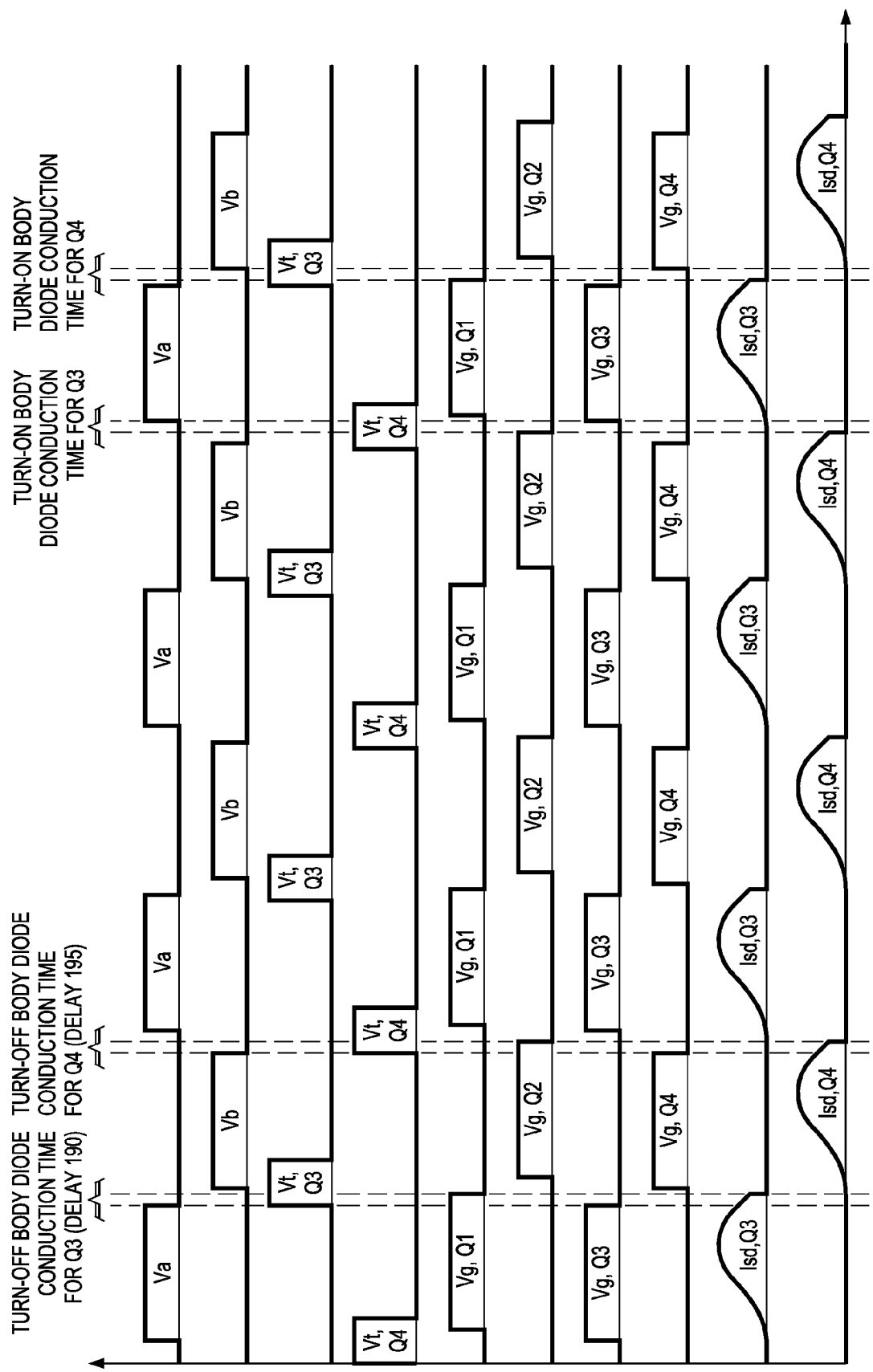
FIGS. 3A-3B illustrate an example of a timing diagram of the LLC converter of FIG. 1 constructed according to the principles of the invention.

The output of the voltage error amplifier 180 is coupled to an input of a voltage controller oscillator ("VCO") 185. The VCO 185 has two voltage controlled waveforms, $V_a$ and $V_b$, such as illustrated in FIG. 3A, and to be described later in this document. These waveforms are never both "on" simultaneously, and $V_e$ controls the frequency of the waveforms. The frequency of $V_a$ and $V_b$ is directly proportional to the magnitude of $V_e$, as $V_e$ increases frequency of $V_a$ and $V_b$ will increase while maintaining the same relative phase relationship. As $V_e$ decreases, so does the frequency of $V_a$ and $V_b$, and without any change in their relative phase relationship.

In the illustrated embodiment, signals $V_a$ and $V_b$ are inverted by an inverter 172, 177, respectively. This inversion can be for reasons of buffering. The inverted signals are then conveyed to a differentiator 170, 175, respectively.

The differentiator 170, 175 will each output a signal in the event that its respective $V_a$ or $V_b$ signal transitions from a high to low signal, but it otherwise does not react to their respective $V_a$ and $V_b$ signals. In one embodiment, the differentiators 170 and 175 output a high to low signal of a fixed duration when their respective $V_a$ and $V_b$ signals transition from high to low, although other embodiments are within the scope of the invention. The differentiator 170 and the differentiator 175 are coupled to a driver 160, 165 respectively.

The drivers 160, 165 are coupled to a gate of the rectifying Q3 150 and the rectifying Q4 155, respectively. The drivers 160, 165 are also coupled to a drain and a source of the Q3 150 and the Q4 155, respectively, as well. Generally, the drivers 160, 165 both: a) measure a forward body diode conduction current for Q3 150 and Q4 155, respectively, and b) turn on and off Q3 150 and Q4 155, respectively. As will be explained in more detail regarding FIGS. 2A-2B and FIG. 3, a turn-on of the Q3 150 and Q4 155 by the drivers 160, 165 occurs when the driver 160, 165 senses a turn-on forward body conduction current. A turn-off of the Q3 150 and Q4 155 by the drivers 160, 165 occurs when the driver 160, 165 receives a turn-off command from the differentiators 170, 175, respectively.

Generally, the LLC 100 employs a sensing of a turn-on body conduction voltage to help reduce a conduction time of a body conduction diode on the secondary (rectifying) side of the LLC 100, thereby helping to reduce power and heat dissipation during a turn on.

In the LLC 100, the signal $V_a$ is coupled to a delay 190, and the signal $V_b$ is coupled to a delay 195. These delays are configured to delay a propagation of the signals $V_a$ and $V_b$, and the delays 190, 195 are programmable or otherwise configurable or adjustable. The delay 190 is then coupled to a gate of the Q1 110, and the delay 195 is then coupled to a gate of the Q2 120.

Generally, the LLC 100 employs the delays 190, 195 to reduce a turn-off difference between turning off a primary Q1 110, Q2 120 and a corresponding rectifying Q3 150, 155. Generally, a corresponding primary or secondary FET can be defined as a primary or secondary FET that is driven by the same $V_a$ or $V_b$ as a corresponding secondary or primary FET. A non-corresponding primary or secondary FET can be defined as a primary or secondary FET that is driven by a different $V_a$ or $V_b$ as a non-corresponding secondary or primary FET.

For example, in the LLC 100, Q1 110 and Q3 150 are corresponding FETS, and Q2 120 and Q4 155 are corresponding FETS. In the LLC 100, Q1 110 and Q4 155 are non-corresponding FETS, and Q2 120 and Q3 150 are non-corresponding FETS In the LLC 100, a turn-off signal to the second rectifying transistor Q3 150 has an aggregate delay time through the inverter 172, the differentiator 170, and the driver 160 until the driver 160 generates a turn-off signal to the Q3 150. This delay can be in the tens of nanoseconds. Therefore, the delay 190 is programmed, calibrated or otherwise adjusted so that the primary Q2 120 is turned off just after a corresponding Q3 150, thereby leading to a minimum amount of time that Q3 150 conducts current through its body diode during turn off.

As will be described regarding FIGS. 2A and 2B, the current that is conducted through the body diode of the rectifying Q3 150 stops as soon as Q1 120 turns off. Therefore, a substantial lessening, such as a minimization, of an amount of difference between Q3 turn-off and Q1 turn-off is generally advantageous. This is unlike prior art designs, which generally relied upon 'worst-case' tolerances in synchronization.

In some embodiments, the power controller of claim 1 wherein the delay of a first deactivation signal $V_a$ minimizes a duration of said conduction time of a deactivation body diode conduction current of a first rectifying FET 150. The delay of the first deactivation signal can be programmable in the delays 190, 195. In some embodiments, the drivers 160, 165 are configured to not activate its corresponding rectifying FETs 150, 155 if the driver 160, 165 senses a body conduction current that is a deactivation body diode conduction current. In one embodiment, there is a minimum turn-off time in the driver 160 and 165 that gets activated after a deactivation that prevents double triggering of the corresponding rectifying FETs 160 and 165.

In some embodiments, the first rectifying FET 150 has a channel conduction path after the first rectifying FET 150 is activated by the first driver 160. The first driver 160 further includes a body diode conduction sensor that detects a body diode conduction current by measurement of a body diode conduction voltage of the first rectifying FET 150 that can be used for turning off the first rectifying FET 150. In the LLC 100, a resonance frequency occurs due to an interaction between an inductor, a transformer, and a capacitor on a primary side of said power controller, and a firing frequency of the first primary FET is less than the resonance frequency.

Figure 2:
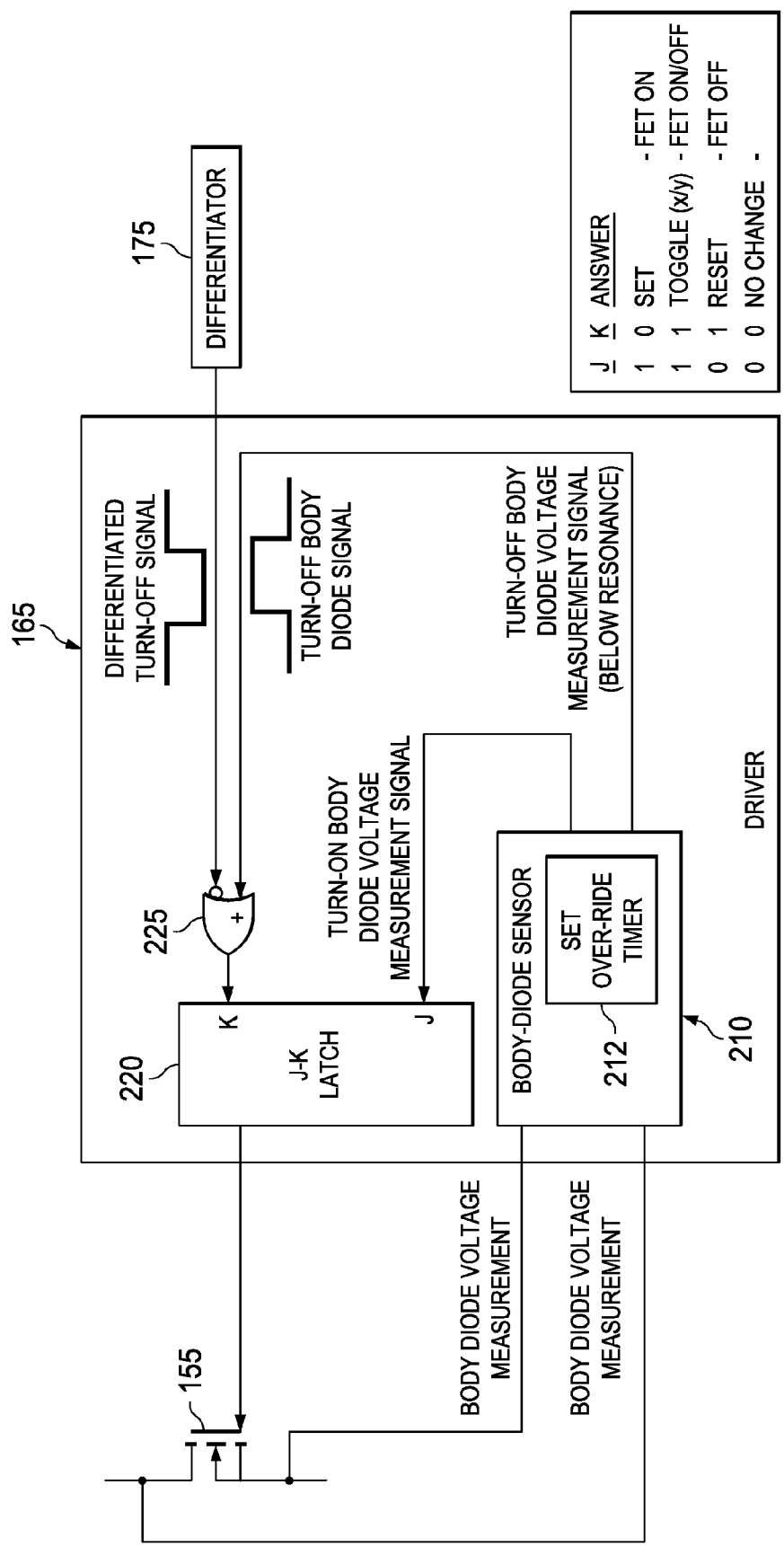
FIG. 2 is a diagram of one embodiment of a driver circuit constructed according to the principles of the invention to be employed with the LLC converter of FIG. 1.

Turning now to FIG. 2, illustrated is the driver 165 in more detail. As is illustrated, the driver 165 is coupled to the rectifying Q4 155. The driver 165 measures a body conduction voltage across the Q4 155, turns on the Q4 155 through a signal applied to its gate based upon this measurement, and turns off the Q4 155 through a turn-off signal received from the differentiator 175.

The driver 165 includes a body diode sensor ("sensor") 210. The body diode sensor 210 includes a set over-ride timer 212. The sensor 210 has two outputs: a turn-on body diode voltage measurement signal, and a turn-off body diode voltage measurement signal. The turn-off body diode voltage measurement signal only occurs if the LLC 100 is operating below resonance, $V_a$ and $V_b$ signal frequencies are below $F_s$. Otherwise, if the LLC 100 is operating at or above resonance, the turn-off body diode voltage measurement signal is over-ridden by differentiators 170 and 175.

In some embodiments, the body sensor diode 210 is an IR1167 SmartRectifier™ Control IC, such as found in Salato, et al., "Application Note AN-1087: Design of Secondary Side Rectification using IR1167 SmartRectifier™ Control IC," International Rectifier, incorporated herein by reference in its entirety.

The turn-on body diode voltage measurement signal is coupled to a J input of a J-K latch 220. The turn-off body diode voltage measurement signal is coupled to an OR gate 225. Coupled to another input of the OR gate 225 is an inverted output of the differentiator 175. The output of the OR gate 225 is conveyed into a K input of the J-K latch 220. The output of the J-K latch 220 is coupled to the gate of the Q4 155.

The driver 165 can work as follows. Upon start-up, after the corresponding primary transistor Q2 120 is first turned on, or after start-up, and the primary transistor Q1 is first turned off, there will be a body conduction voltage generated across the corresponding Q4 155. Therefore, the turn-on body diode voltage measurement turns on, which applies a "1" input to the "J" input of the J-K latch 220. As the "K" input is zero (to be discussed below), this is a J, K input of "1 0" into the J-K latch 220. This gives an output of "SET" which is a "1", which then also outputs an "on" signal to the Q4 155.

Even when the body diode sensor 210 outputs a "0" value due to the Q4 155 being turned "on" and therefore the body conduction voltage is below a given threshold, this is a J-K input of "0 0" which is "no change", and the J-K latch 220 continues to output a "1" thereby keeping on the Q4 155.

However, when a "turn-off signal" is generated by the differentiator 175 and received by the J-K latch 220, the "J" input to the J-K latch 220 remains "0", but the inverted input to the OR gate 225 becomes a "1", then the input to the "K" input of the J-K latch is a "1." Therefore, this generates a "RESET" value, which is an output of "0" for the J-K latch 220. This then applies an off signal to the gate of Q4 155, thereby turning off Q4 155.

Furthermore, in the event that the LLC 100 is operating below resonance $F_s$ and a "turn-off body diode signal" is generated and received by the body diode sensor 210, the "J" input to the J-K latch 220 remains "0", but the input to the OR gate 225 becomes a "1", then the input to the "K" input of the J-K latch 220 is a "1." Therefore, this also generates the "RESET" value, which is an output of "0" for the J-K latch 220. Therefore, this then also applies an off signal to the gate of Q4 155, thereby turning off Q4 155.

Figure 3B:
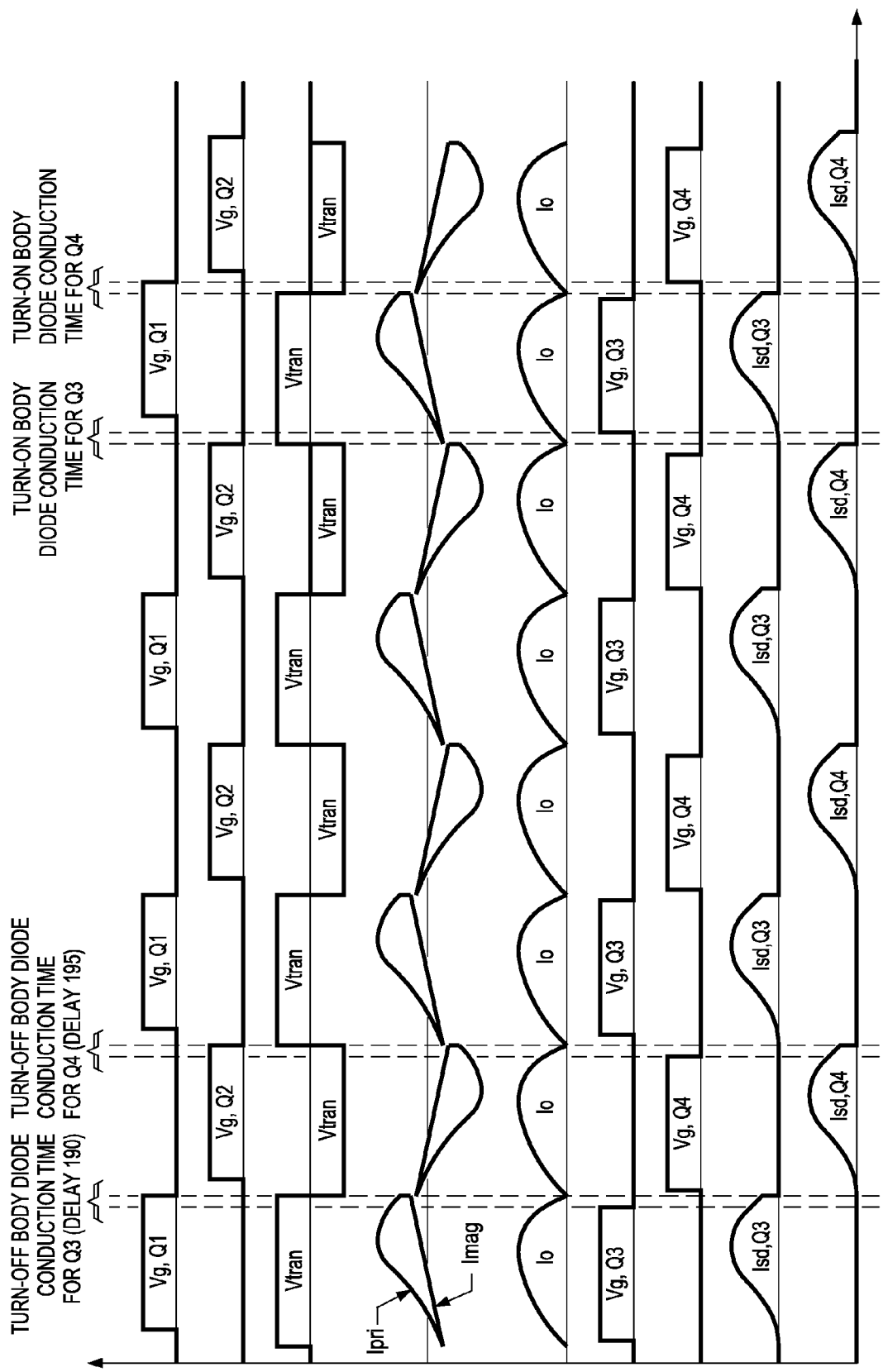

Turning now to FIGS. 3A and 3B, illustrated are timing diagrams that shall be described, for ease of discussion, in reference to FIGS. 1 and 2.

In FIG. 3A, voltage waveforms $V_a$ and $V_b$ are illustrated. Each of these waveforms is generated by the VCO 185. Then, upon the off-transition of $V_a$ and $V_b$, a turn-off signal $V_t$, Q3 and $V_t$, Q4 are generated by the differentiators 170, 172, respectively. Also, after a delay defined by the delays 190, 195, a turn-off signal $V_g$, Q1 occurs for the Q1 110 and a turn-off signal $V_g$, Q2 occurs for the Q2 120. During the time when rectifying Q3 150 is turned off but primary Q1 110 has not yet been turned off, turn-off body conduction current through Q3 150 continues to flow. However, once the Q1 110 has been turned off, conduction current immediately starts to flow through rectifying Q4 155. Therefore, by adjusting the timing delay 190, a duration of the turn-off body conduction current for a corresponding rectifying MOSFET Q3 150, Q4 155 can be reduced, and in some embodiments, minimized, thereby advantageously reducing power and heat dissipation in the Q3 150 and Q4 155 FETs.

Then, after an increment of time, the signal $V_b$ is turned on. This turn-on signal is ignored by the differentiator 175. However, once the body diode conduction current resulting from the primary Q1 110 being turned off reaches a certain level in the Q4 155, the driver 165 applies the $V_g$, Q4 signal to the rectifying Q4 155. After a delay 195, the primary Q2 120 is turned on. This starts to greatly increase the current through Q4, although Q4 may have already been turned on by a measurement of an increase of a body diode conduction current through Q4 155.

Turning now to FIG. 3B, illustrated are some general waveforms associated with the transformer 140. As illustrated, the waveforms $V_{tran}$, the waveform across the primary of the transformer, changes polarity after every off transition of the Q1 110 and Q2 120. The magnetizing current increases as the transformer stays positive, and becomes negative as the transformer polarity switches to negative. Likewise, the rated primary current behaves somewhat like a truncated sinusoid, which again changes its polarity upon a downward transition of Q1 110 and Q2 120. Likewise, the output current $I_o$ is at a minimum when the non-corresponding primary transistor turns on.

Figure 4:
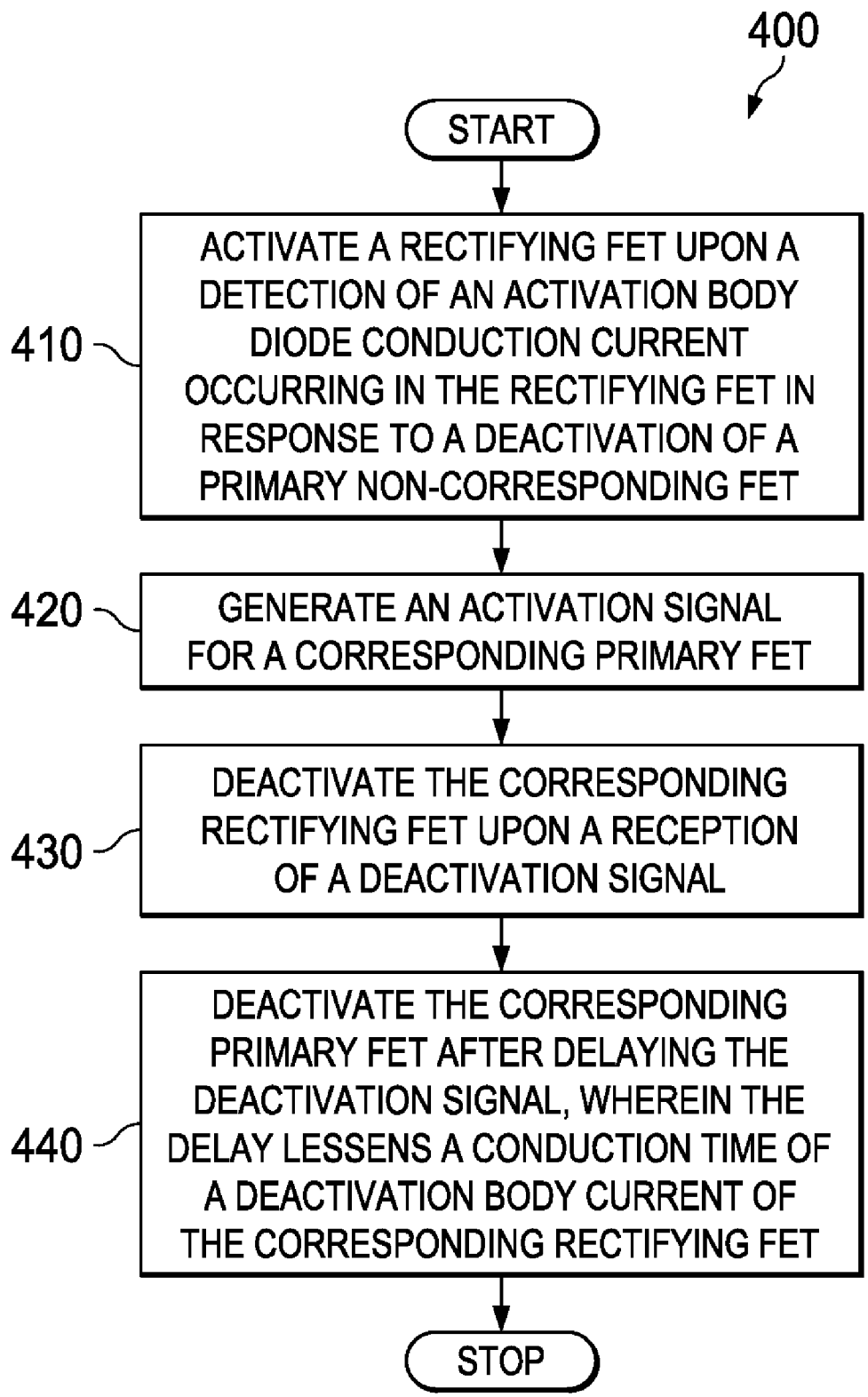
FIG. 4 illustrates a flow diagram of one embodiment of a method of an employment of the LLC converter of FIG. 1 that is constructed according to the principles of the invention.

Turning now to FIG. 4, illustrated is a method 400 for an operation of an LLC converter, such as the LLC converter 100. In a step 410, a rectifying FET is activated upon a detection of an activation body diode conduction current in the rectifying FET. In some embodiments, this activation body diode conduction current can be in response to a deactivation of a non-corresponding FET.

In a step 420, an activation signal is generated for a corresponding primary FET. In a step 430, the corresponding rectifying FET is deactivated upon a reception of the deactivation signal. Upon a turn-off of the rectifying FET, a deactivation body diode conduction current occurs. In a step 430, the corresponding primary FET is deactivated after delaying the deactivation signal. The delay of the activation signal lessens a conduction time of a deactivation body current of the corresponding rectifying FET. In some embodiments, the body diode conduction current occurs in the rectifying FET in response to a deactivation of a primary-non corresponding FET.

In some further embodiments of the method 400, a second rectifying FET is activated upon a detection of an activation body diode conduction current occurring in the second rectifying FET. The corresponding second rectifying FET is deactivated upon a reception of a second deactivation signal. The corresponding second primary FET is deactivated after delaying the second deactivation signal wherein the second delay lessens a conduction time of a deactivation body current of the second corresponding rectifying FET. In some embodiments, the delay is proportional to an allotted time of a deactivation body diode current conduction of the corresponding rectifying FET after the rectifying FET is deactivated but before the first primary FET is deactivated. In some embodiments, a delay time of the delayed deactivation signal through an employment of operational tolerances of conduction parameters of at least the primary FET and at least the corresponding rectifying FET.

In other embodiments, other configurations of an LLC converter 100 can be used, such as a half bridge with split resonant capacitors 130 connected across and an input and the junction of the capacitor is connected to one end of the transformer 140. In a different configuration a Full Bridge consisting of two more FET's similar to 110 and 120 can be used. In a clamped version of Half Bridge LLC two clamping diodes are connected across the split resonant capacitor 130 configurations.

Those skilled in the art to which the invention relates will appreciate that other and further additions, deletions, substitutions and modifications may be made to the described embodiments without departing from the scope of the invention.

What is claimed is:

1. A synchronous field effect transistor (FET) power controller, comprising:
    a first rectifying FET;
    a first driver coupled to said first rectifying FET that is configured to both:
        (a) activate said first rectifying FET if said first driver senses an activation body diode conduction current of said first rectifying FET, and
        (b) deactivate said first rectifying FET if said first driver receives a first deactivation signal; and
    a first primary FET that is deactivated by a delay of said first deactivation signal; and wherein said delay lessens a duration of a conduction time of a deactivation body diode conduction current of said first rectifying FET;
    wherein a positive node of an output port is coupled to a center tap of a secondary winding of a transformer coupled to said first rectifying FET.

2. The power controller of claim 1 wherein said delay of said first deactivation signal minimizes said duration of said conduction time of said deactivation body diode conduction current of said first rectifying FET.

3. The power controller of claim 1 wherein said delay of said first deactivation signal is programmable.

4. The power controller of claim 1 wherein said driver is configured to not activate said rectifying FET if said driver senses a body conduction current that is a deactivation body diode conduction current.

5. The power controller of claim 1 wherein said activation body diode conduction current of said first rectifying FET begins before both said first primary FET and before said first rectifying FET is activated.

6. The power controller of claim 1 further comprising:
    a second rectifying FET;
    a second driver coupled to said second rectifying FET that is configured to both:
        (a) activate said second rectifying FET if said second driver senses a second activation body diode conduction current of said second rectifying FET, and
        (b) deactivate said second rectifying FET if said second driver receives a second deactivation signal; and
    a second primary FET that is deactivated by a second delay of said second deactivation signal wherein said second delay lessens a duration of a conduction time of a second deactivation body diode conduction current of said second rectifying FET.

7. The power controller of claim 6 wherein said first primary FET and said second primary FET not active simultaneously.

8. The power controller of claim 6 further comprising a voltage controlled oscillator coupled to said first and second rectifying FETs to generate said deactivation signals.

9. The power controller of claim 1 further comprising said first rectifying FET having a channel conduction path after said first rectifying FET is activated by said first driver.

10. The power controller of claim 1 wherein said FET comprises a metal oxide semiconductor field effect transistor ("MOSFET").

11. The power controller of claim 1 wherein said first driver further comprises a body diode conduction sensor that detects a body diode conduction current by measurement of a body diode conduction voltage of said first rectifying FET.

12. The power controller of claim 1 wherein a resonance frequency occurs due to an interaction between an inductor, a transformer, and a capacitor on a primary side of said power controller, and a firing frequency of said first primary FET is less than said resonance frequency.

13. A method for operating a power controller, comprising:
    activating a rectifying FET upon a detection of an activation body diode conduction current occurring in said rectifying FET;
    generating an activation signal for a corresponding primary FET;
    deactivating said corresponding rectifying FET upon a reception of a deactivation signal; and
    deactivating said corresponding primary FET after delaying said deactivation signal wherein said delay lessens a conduction time of a deactivation body current of said corresponding rectifying FET;
    wherein a positive node of an output port is coupled to a center tap of a secondary winding of a transformer coupled to said first rectifying FET.

14. The method of claim 13 wherein said delay of said deactivation signal minimizes said duration of said conduction time of said deactivation body diode conduction current of said rectifying FET.

15. The method of claim 13 wherein said delay is programmable.

16. The method of claim 13 further comprising:
activating a second rectifying FET upon a detection of an activation body diode conduction current occurring in said second rectifying FET;
generating an activation signal for a corresponding second primary FET;
deactivating said corresponding second rectifying FET upon a reception of a second deactivation signal; and
deactivating said corresponding second primary FET after delaying said second deactivation signal wherein said second delay lessens a conduction time of a deactivation body current of said second corresponding rectifying FET.

17. The method of claim 16 wherein said first primary FET and said second primary FET are not in an active state simultaneously.

18. The method of claim 16 wherein a deactivation body diode conduction current of said corresponding rectifying FET is halted by an activation of a second primary FET wherein said activation is determined by a second delay.

19. The method of claim 13 wherein said delay is proportional to an allotted time of a deactivation body diode current conduction of said corresponding rectifying FET after said rectifying FET is deactivated but before said first primary FET is deactivated.

20. The method of claim 13 further comprising determining a delay time of said delayed deactivation signal through an employment of operational tolerances of conduction parameters of at least said primary FET and at least said corresponding rectifying FET.

21. The method of claim 13 wherein said body diode conduction current occurs in said rectifying FET in response to a deactivation of a primary-non corresponding FET.

22. A power converter, comprising:
a plurality of primary field effect transistors (FETs);
a first primary inductor and a primary capacitor coupled to said plurality of primary FETs;
a transformer coupled to said primary capacitor;
a plurality of rectifying FETs coupled to said transformer;
a first and second driver, each of said first and second drivers coupled to a rectifying FET of said plurality of rectifying FETs wherein each driver is configured to:
(a) activate its coupled rectifying FET if a driver senses an activation body diode conduction current of its coupled rectifying FET, and
(b) deactivate its coupled rectifying FET if said driver receives a deactivation signal; and
wherein said primary FETs are each deactivated by a delay of a corresponding deactivation signal;
wherein said delays each lessen a duration of a conduction time of a deactivation body diode conduction current of said first and second rectifying FETs; and
wherein a positive node of an output port is coupled to a center tap of a secondary winding of a transformer coupled to said first rectifying FET.

23. The power converter of claim 22 wherein said first driver does not activate its coupled rectifying FET if said first driver senses a body diode conduction current in its coupled rectifying FET that is a deactivation body diode conduction current.

24. The power converter of claim 22 wherein said activation body diode conduction current of a first rectifying FET of said plurality of rectifying FETs begins after a first primary FET is activated of said primary FETs but before said first rectifying FET is activated.

25. The power converter of claim 22 wherein said first and second drivers each comprise a body diode conduction sensor that detects a body diode conduction current by measurement of a body diode conduction voltage.

26. The power converter of claim 22 wherein a resonance occurs due to an interaction between said first primary inductor, said transformer, and said primary capacitor, and a firing frequency of said first primary FET is less than said resonance frequency.

* * * * *